US007844175B2

(12) United States Patent
Gotanda

(10) Patent No.: US 7,844,175 B2
(45) Date of Patent: Nov. 30, 2010

(54) PHOTOGRAPHING APPARATUS AND METHOD

(75) Inventor: Yoshiharu Gotanda, Yokohama (JP)

(73) Assignee: Samsung Electronics Co., Ltd., Suwon-si (KR)

(*) Notice: Subject to any disclaimer, the term of this patent is extended or adjusted under 35 U.S.C. 154(b) by 581 days.

(21) Appl. No.: 11/981,180

(22) Filed: Oct. 31, 2007

(65) Prior Publication Data
US 2008/0158409 A1 Jul. 3, 2008

(30) Foreign Application Priority Data
Dec. 28, 2006 (JP) ............... 2006-356163

(51) Int. Cl.
G03B 17/00 (2006.01)
(52) U.S. Cl. ..................................... 396/123
(58) Field of Classification Search ............. 396/104, 396/121–125
See application file for complete search history.

(56) References Cited

U.S. PATENT DOCUMENTS

| 7,764,321 | B2* | 7/2010 | Sugimoto | ............ 348/345 |
| 2006/0028576 | A1 | 2/2006 | Ito | |
| 2007/0030381 | A1 | 2/2007 | Maeda | |
| 2007/0201851 | A1* | 8/2007 | Misawa et al. | ............ 396/125 |
| 2008/0037975 | A1* | 2/2008 | Nakajima | ............ 396/104 |
| 2008/0050108 | A1* | 2/2008 | Mizutani et al. | ............ 396/104 |

FOREIGN PATENT DOCUMENTS

| JP | 2003-075717 A | 3/2003 |
| JP | 2004-185555 A | 7/2004 |
| JP | 2006-025238 A | 1/2006 |
| JP | 2006-201282 A | 8/2006 |

OTHER PUBLICATIONS

Notice of Allowance issued for JP2006-356163.

* cited by examiner

Primary Examiner—W. B. Perkey
(74) Attorney, Agent, or Firm—Drinker Biddle & Reath LLP

(57) ABSTRACT

A photographing apparatus and method for recognizing an object such as a face in an image. The photographing apparatus includes: an optical system comprising a focus lens; a photoelectric transformation element transforming light information into an electrical signal; an image signal processor outputting the electrical signal as an image signal; a first distance measurer detecting face region data corresponding to a face from the image signal, comparing the face region data with standard face data, and obtaining a first object distance from the photographing apparatus to the face; a second distance measurer detecting a focus position for the face and obtaining a second object distance from the photographing apparatus to the face; and a face recognizer comparing the first and second object distances and recognizing that the face region data includes data corresponding to the face.

20 Claims, 6 Drawing Sheets

FIG. 3
DISTANT
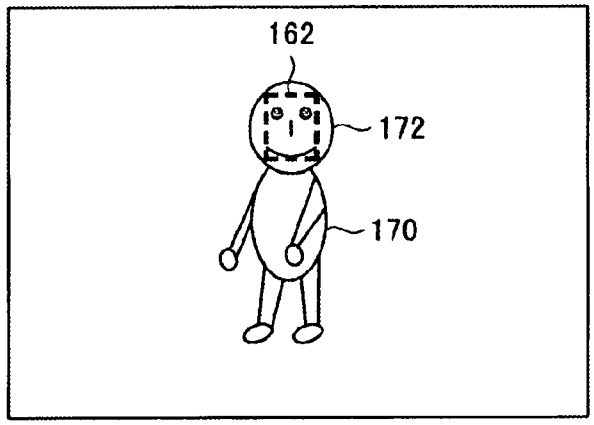
⇧ SMALL→DISTANT
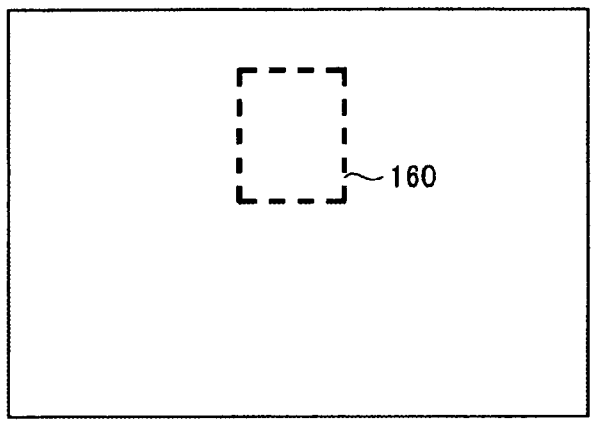
⇩ LARGE→NEAR
NEAR
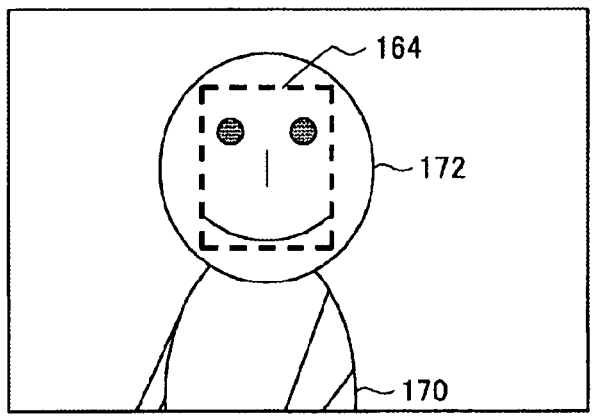

PHOTOGRAPHING APPARATUS AND METHOD

CROSS-REFERENCE TO RELATED PATENT APPLICATION

This application claims the benefit of Japanese Patent Application No. 2006-356163, filed on Dec. 28, 2006, in the Japanese Intellectual Property Office, the disclosure of which is incorporated herein in its entirety by reference.

BACKGROUND OF THE INVENTION

1. Field of the Invention

The present invention relates to a photographing apparatus and method, and more particularly, to a photographing apparatus and method for accurately recognizing a face image in an area displaying a face of a person when photographing the person and reducing the likelihood of recognizing an area not displaying the face of a person as a face.

2. Description of the Related Art

Typically, when photographing is performed using a photographing apparatus, a distance to a target is determined using a phase difference detection type distance measuring apparatus, and then a focusing operation is performed with respect to the target based on the distance. In many cases, the target is a person. To capture a high quality image of a person, a photographing apparatus should have functions of automatically performing a focusing operation and an exposure operation based on the distance or other qualities of the person to be photographed.

Often, a photographing apparatus such as a digital still camera uses a technique for capturing a high quality image of a face of a person by performing a focusing operation against the face. Also, the photographing apparatus may use a technique for performing an exposure operation according to the brightness of the face.

For example, Japanese Patent Publication Gazette No. 2003-75717 discloses a technique for detecting a distance to an object and using the detected distance for performing a focusing operation of a photographing apparatus. In the disclosure of the patent publication, the photographing apparatus stores information regarding a standard size of a face of a person and compares the size of the face with an obtained size of a face in a photographed image area of the photographing apparatus to detect the distance to the face and uses the distance information during focusing.

However, when the above-described technique is used to detect a face, an object having a similar data pattern to the face of a person, e.g., a tree, is frequently mistaken for the face of a person. In such a case, the focusing operation is performed with respect to the object instead of the face of a person or the focusing operation takes a long time.

Other features of a digital photographing apparatus may also be dependent on accurately recognizing a face in an image. For example, the operating mode of a camera may be set to a portrait mode if a face is detected. Thus, a number of camera settings and functions may be based on accurately identifying a face in an image. Accordingly, mistaking an object for a face in an image likely reduces the quality of images captured by a camera relying on face detection technology.

Thus, technology for accurately detecting an object such as a face in an image is needed.

SUMMARY OF THE INVENTION

The present invention provides a photographing apparatus and method for accurately recognizing a face of a person in a photographed image.

The present invention also provides a photographing apparatus and method for reducing the likelihood of recognizing an area that does not contain a face as an area containing a face.

The present invention also provides a photographing apparatus and method for improving a function of focusing on a person when photographing the person, obtaining an optimal exposure for the face of the person, and obtaining an optimal color balance for the face of a person as well as optimizing other camera functions and settings to obtain a quality image.

The present invention provides a photographing apparatus and method for recognizing a face of an object by comparing a first object distance obtained by comparing face region data with standard face data with a second object distance obtained based on a position of a focus lens at a focus position.

According to an aspect of the present invention, there is provided a photographing apparatus including: an optical system forming an image and including a focus lens; a photoelectric transformation element transforming light information into an electrical signal; an image signal processor outputting the electrical signal as an image signal; a first distance measurer detecting face region data corresponding to a face of a person from the image signal, comparing the face region data with standard face data pre-stored by a storage unit, and obtaining a first object distance from the photographing apparatus to an object of the face region data; a second distance measurer detecting a focus position of the object of the face region data and obtaining a second object distance from the photographing apparatus to the object of the face region data; and a face recognizer comparing the first and second object distances and recognizing the object of the face region data as the face.

According to this embodiment, the face region may compare the first and second object distances respectively obtained by the first and second measurers to recognize whether the object of the face region data is the face. Therefore, the face recognizer may accurately recognize the object of the face region data corresponding to the face of the person as the face during photographing and reduce an error of recognizing an area not displaying the face of the person as the face. As a result, the likelihood of capturing a poor quality image caused by a face recognition error can be reduced.

The first distance measurer may include: a face detector detecting area data of the object of the face region data; and a database (DB) storing a relationship among a focal distance of the optical system, the standard area data of the face, and a standard distance to the face, wherein the first distance measure obtains the first object distance based on the focal distance and the area data of the object read from the DB.

According to this embodiment, the first object distance may be obtained from a standard distance from the photographing apparatus to the face by comparing standard area data of the face corresponding to the focal distance and the detected area data of the object.

The second measurer may include: a focus position detector detecting the focus position of the object of the face region data, wherein the second measurer obtains the second object distance based on a position of the focus lens of the optical system in the focus position and the focal distance.

According to this embodiment, the second object distance may be obtained based on the position of the focus lens which varies when the focus position of the object is detected.

The photographing apparatus may further include a reliability value calculator comparing the first and second object distances to calculate a reliability value of the face region data, wherein the face recognizer recognizes the object of the face region data as the face based on the reliability value.

According to this embodiment, a determination may be made as to whether the object of the face region data detected by the face detector is the face based on the reliability value calculated through the comparison between the first and second object distances.

The photographing apparatus may further include an adjuster adjusting at least one of a focus, an exposure, and a color balance for the object recognized as the face by the face recognizer.

According to this embodiment, the object of the face region data may be accurately recognized as the face. Thus, a focus performance of the person can be improved when the person is photographed. Also, an optimal exposure to the face of the person may be obtained. In addition, a color balance performance of the face of the person can be improved when the person is photographed.

The photographing apparatus may further include a face display displaying the object recognized as the face by the face recognizer in an area of a photographed image.

According to this embodiment, only the object recognized as the face in the area of the photographed image may be indicated.

According to another aspect of the present invention, there is provided a photographing method including: transforming light beams focused by an optical system forming an image into an electrical signal and outputting the electrical signal as an image signal; detecting face region data corresponding to a face of a person from the image signal, comparing the face region data with pre-stored standard face data, and obtaining a first object distance from a photographing apparatus to an object of the face region data; detecting a focus position of the object of the face region data and obtaining a second object distance from the photographing apparatus to the object of the face region data; and comparing the first and second object distances and recognizing the object of the face region data as the face.

According to this embodiment, the first object distance obtained by the first distance measurer and the second object distance obtained by the second distance measurer may be compared to recognize whether the object of the face region data is the face. Therefore, the object of the face region data corresponding to the face of the person may be accurately recognized as the face during photographing, an error of recognizing an area not displaying the face of the person as the face may be reduced. As a result, a photographing failure caused by a recognition error can be reduced.

The detection of the face region data may include: detecting area data of the object of the face region data; and obtaining the first object distance based on a focal distance and the area data of the object read from a DB pre-storing a relationship among the focal distance of the optical system, the standard area data of the face, and a standard distance to the face.

According to this embodiment, the first object distance may be obtained from a standard distance from the photographing apparatus to the face by comparing standard area data of the face corresponding to the focal distance and the detected area data of the object.

The detection of the focus position of the object of the face region data may include: detecting the focus position of the object of the face region data; and obtaining the second object distance based on the position of the focus lens of the optical system in the focus position and the focal distance.

According to this embodiment, the second object distance may be obtained based on the position of the focus lens which varies when the focus position of the object is detected.

The comparison between the first and second object distances and recognition of the object of the face region data as the face may include: comparing the first and second object distances to calculate a reliability value of the face region data; and recognizing the object of the face region data as the face based on the reliability value.

According to this embodiment, a determination may be made whether the object of the face region data detected by the face detector is the face based on the reliability value calculated through the comparison between the first and second object distances.

The photographing method may further include adjusting at least one of a focus, an exposure, and a color balance for the object recognized as the face.

According to this embodiment, the object of the face region data may be accurately recognized as the face. Thus, a focus performance of the person can be improved when the person is photographed. Also, an optimal exposure to the face of the person may be obtained. In addition, a color balance performance of the face of the person can be improved when the person is photographed.

The photographing method may further include displaying the object recognized as the face by the face recognizer in an area of a photographed image.

According to this embodiment, only the object recognized as the face in the area of the photographed image may be indicated.

BRIEF DESCRIPTION OF THE DRAWINGS

The above and other features and advantages of the present invention will become more apparent by describing in detail exemplary embodiments thereof with reference to the attached drawings in which:

FIG. 3 illustrates an operation of calculating a distance from an object to the photographing apparatus of FIG. 1;

DETAILED DESCRIPTION OF THE INVENTION

Figure 1:
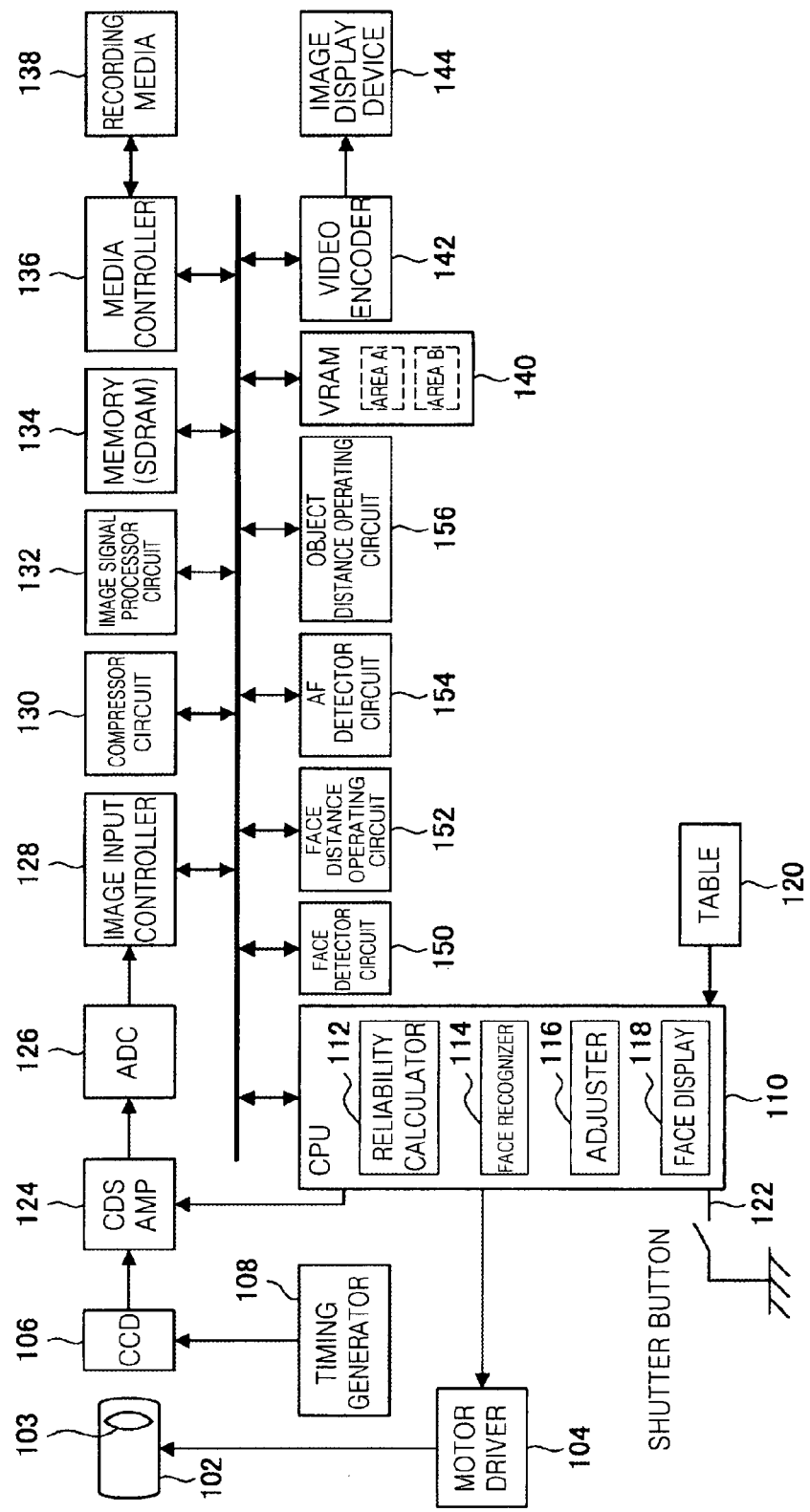
FIG. 1 is a block diagram of a photographing apparatus according to an embodiment of the present invention.

Hereinafter, a photographing apparatus and method according to embodiments of the present invention will be described in detail with reference to the attached drawings.

Like reference numerals in the drawings denote like elements, and thus repeated descriptions have been omitted.

A structure of a photographing apparatus according to an embodiment of the present invention will now be described.

FIG. 1 is a block diagram of a photographing apparatus 100 according to an embodiment of the present invention. Referring to FIG. 1, the photographing apparatus 100 according to the present embodiment includes an optical system 102 for forming an image, a motor driver 104, a charge-coupled device (CCD) 106, a timing generator 108, a central processing unit (CPU) 110, a correlated double sampling (CDS)/amplifier (AMP) 124, an analog-to-digital converter (ADC) 126, an image input controller 128, a compressor circuit 130, an image signal processor circuit 132, a memory 134, a media controller 136, a recording media 138, a video random access memory (VRAM) 140, a video encoder 142, an image display device 144, a face detector circuit 150, a face distance operating circuit 152, an automatic focusing (AF) detector circuit 154, and an object distance operating circuit 156.

The optical system 102 forms external optical information as an image on the CCD 106. The optical system 102 includes a lens unit (not shown), a zoom unit (not shown), a focus unit (not shown) having a focus lens 103, and an aperture unit (not shown) changing a size of an aperture to confine a direction or range of light beams, and a tube-shaped barrel (not shown) in which a lens is mounted. In an embodiment, the optical system 102 may be a short focus lens or a zoom lens. In another embodiment, the motor driver 104 drives the zoom, focus, and aperture units of the optical system 102.

The CCD 106 includes devices, which convert optical information incident through the optical system 102 into an electric signal, and generates electrical signals using light received by the devices. In the present embodiment, the CCD 106 is used as a photoelectric transformation element, but the present invention is not limited to this. For example, the photoelectric transformation element may be a complementary metal-oxide semiconductor (CMOS) or the like.

A mechanical shutter (not shown) may be used to control an exposure time of the CCD 106 in order to intercept light when photographing is not performed, so that light is incident only during the performance of photographing. The present invention is not limited to the mechanical shutter and thus may use an electronic shutter (not shown). An operation of the mechanical or electronic shutter may be performed by a switch of a shutter button 122 connected to the CPU 110.

The timing generator 108 inputs a timing signal into the CCD 106, controls an exposure period of each of pixels constituting the CCD 106, and controls reading of charges.

An image processing unit including the CDS/AMP 124, the ADC 126, the image input controller 128, the compressor circuit 130, and the image signal processor circuit 132 will be described, hereinafter.

The CDS/AMP 124 removes low frequency noise from the electrical signal output from the CCD 106 and amplifies the electrical signal up to a predetermined level.

The ADC 126 converts an analog electrical signal into a digital signal. The image input controller 128 processes the digital signal to process image and voice signals.

The compressor circuit 130 converts input image data of the digital signal into data compressed using a compression format "JPEG," "LZW," or the like.

The image signal processor circuit 132 synthesizes images and outputs the synthesized image to the memory 134.

The memory 134 may be a semiconductor memory device such as a synchronous dynamic random access memory (SDRAM) or the like and temporarily stores a time-divided photographed image. The memory 134 also stores an operation program of the CPU 110.

The media controller 136 controls writing of image data to the recording media 138 and reading of the image data or setup information from the recording media 138.

The recording media 138 may be an optical recording media, a magneto-optical disc, a magnetic disc, a semiconductor storage medium, or any other device used to record information. Photographed image data is recorded on the recording media 138. The recording media 138 may be connected to and/or separated from the photographing apparatus 100.

The VRAM 140 is an image display memory, i.e., a memory including a plurality of channels to simultaneously execute storing of a display image and displaying of the display image on the image display device 144.

The video encoder 142 compresses a dynamic image and outputs a compressed frame to the image display device 144. For example, the image display device 144 may be a liquid crystal display or the like and display an image read from the VRAM 140.

The photographing apparatus 100 includes the face detector 150 as an example of a face detector. The face detector circuit 150 detects face region data corresponding to a face of a person from an image signal of a photographed image obtained by the photographing apparatus 100. For example, the face region data includes attributes of a relative position of an object of the photographed image, a size of the object, etc. The face detector circuit 150 also detects area data of the object of the face region data.

The face distance operating circuit 152 obtains a first object distance D1 corresponding to a distance from the photographing apparatus 100 to the object based on values such as those in Table 1 below in which the size of the object of the face region data detected by the face detector circuit 150, the focus distance of the optical system 102, and standard area data of the face are recorded.

The face detector circuit 150 and the face distance operating circuit 152 are an example of a first distance measurer. Also, the face detector circuit 150 and the face distance operating circuit 152 are independently illustrated in FIG. 1, but the present invention is not limited to this. Thus, the face detector circuit 150 may be included in the face distance operating circuit 152. Alternatively, the face detector circuit 150 and the face distance operating circuit 152 may be included in the CPU 110.

The AF detector circuit 154 detects a focus position of the object of the face region data detected by the face detector circuit 150. The AF detector circuit 154 is an example of a focus position detector. The focus lens 103 may be driven to obtain an AF evaluation value so as to achieve the detection of the focus position.

A process of detecting the focus position will now be exemplarily described. The focus lens 103 is moved to extract a high frequency component of an image signal and integrate a signal extracted from a predetermined area of a photographed image area to be focused so as to calculate the focus position. An AF evaluation value of the predetermined area forms a curve having a maximum value, and a position of the focus lens 130 in which the AF evaluation value is maximum is regarded as a position to be focused correctly.

The object distance operating circuit 156 obtains a second object distance D2 from the photographing apparatus 100 to the object based on the relative position of the focus lens 103 in the focus position and the focus distance of the optical system 102.

The AF detector circuit 154 and the object distance operating circuit 156 are an example of a second distance measurer. The AF detector circuit 154 and the object distance operating circuit 156 are independently illustrated in FIG. 1, but the present invention is not limited to this. Thus, the AF detector circuit 154 may be included in the object distance operating circuit 156. Alternatively, the AF detector circuit 154 and the object distance operating circuit 156 may be included in the CPU 110.

The CPU 110 transmits signals to and/or receives signals from components of the photographing apparatus 100. The CPU 110 includes a reliability calculator 112, a face recognizer 114, an adjuster 116, and a face display 118.

The CPU 110 reads values such as the ones in Table 1 below. Table 1 includes relationships among the focus distance of the optical system 102, the standard area data of the face, and a standard distance from the photographing apparatus 100 to the face. Table 1 is an example of a database. The present invention is not limited to storing the same data as that shown in Table 1, nor is it limited to the data structure of Table 1.

If the optical system 102 is the short focus lens, the focus distance of the optical system 102 is fixed. If the optical system 102 is the zoom lens, the focus distance of the optical system 102 varies. It has been described that the CPU 110 reads Table 1. Alternatively, the face distance operating circuit 152 may store Table 1.

The reliability calculator 112 compares the first object distance D1 with the second object distance D2 to calculate a reliability value of the face region data. The face recognizer 114 recognizes the object of the face region data as a face based on the reliability value calculated by the reliability calculator 112.

The adjuster 116 adjusts photographing conditions of the object recognized as the face by the face recognizer 114. In detail, the adjuster 116 outputs a signal to the motor driver 104 to drive the focus lens 103 so as to adjust the focus of the object. The adjuster 116 also outputs a signal to the motor driver 104 to drive the aperture unit so as to adjust an exposure to the object. The adjuster 116 outputs a signal to the CPU 110 to adjust a color balance of the object of the photographed image.

When the photographed image is displayed on a screen of the image display device 144, the face display 118 indicates the object, which is recognized as the face by the face recognizer 114, in an area of the photographed image. For example, the face display 118 displays a rectangular frame as a face display frame around the object.

An operation of the photographing apparatus 100 will now be described.

Figure 2:
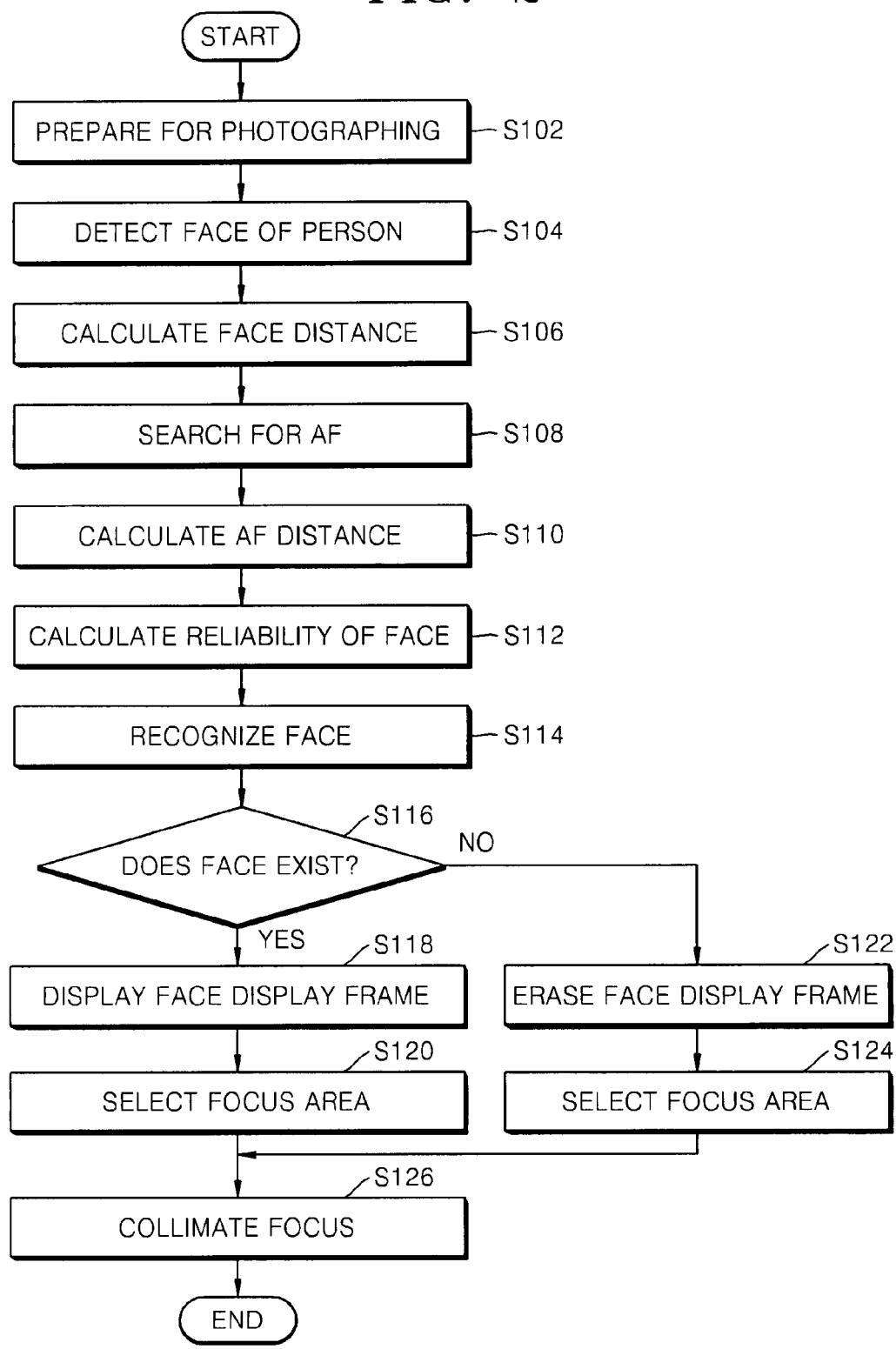
FIG. 2 is a flowchart of an operation of the photographing apparatus of FIG. 1.

FIG. 2 is a flowchart of the operation of the photographing apparatus 100 of FIG. 1.

When photographing is performed using the photographing apparatus 100, optical information incident from the optical system 102 onto the CCD 106 is converted into an electrical signal through the CCD 106 in a photographing ready status. Also, low frequency noise of the electrical signal is removed by the CDS/AMP 124, and then the electrical signal is amplified up to a predetermined level.

The electrical signal is converted into a digital signal through the ADC 126, compressed into data through the image input controller 128, the compressor circuit 130, the image signal processor circuit 132, and the video encoder 142, and output to the image display device 144.

A dynamic image is displayed on the image display device 144 in the photographing ready status. Here, the photographing apparatus 100 displays the dynamic image and simultaneously waits for an operation of the shutter button 122. The VRAM 140 includes two areas, i.e., area 'A' for displaying an image and area 'B' for scanning the image. In operation S102, the two areas are repeatedly converted into frames to display a dynamic image on the photographing apparatus 100.

If the shutter button 122 is pressed, in operation S104, the face detector circuit 150 detects face region data corresponding to a face of a person from an image signal of a photographed image which is displayed immediately before the shutter button 122 is pressed, and a size of an object from the face region data.

In operation S106, the face distance operating circuit 152 compares the size of the object of the face region data detected by the face detector circuit 150 with the standard sizes shown in Table 1 to calculate a first object distance D1 from the photographing apparatus 100 to the object, i.e., a face distance.

In operation S108, the AF detector circuit 154 detects a focus position of the object of the face region data obtained by the face detector circuit 150 and a focus position of a central area of the photographed image. In operation S110, the object distance operating circuit 156 obtains a second object distance (an AF distance) D2 from the photographing apparatus 100 to the object based on a relative position of the focus lens 103 of the optical system 102 in the focus position and a focus distance.

In operation S112, the reliability calculator 112 compares the first object distance D1 with the second object distance D2 to calculate a reliability value of the face region data. In operation S114, the face recognizer 114 recognizes the object of the face region data as a face based on the reliability value calculated by the reliability calculator 112.

In operation S116, the face recognizer 114 determines whether the object of the face region data is a face. If the face recognizer 114 determines in operation S116 that the object of the face region data is the face, in operation S118, the face display 118 displays a face display frame around the object recognized as the face in an area of the photographed image. In operation S120, the CPU 110 determines the object recognized as the face as a focus region.

If the face recognizer 114 determines in operation S116 that the object of the face region data is not the face, the face display 118 does not display the face display frame of the object. If the face display frame is displayed around the object, the face display 118 erases the face display frame in operation S122. If it is determined that the photographed image does not include an area to be recognized as a face, in operation S124, the CPU 110 determines the central area of the photographed image as the focus region.

The adjuster 116 adjusts a focus of the focus region of the object of the face region data or the central area of the photographed image. In other words, in operation S126, the CPU 110 drives the motor driver 104 and moves the focus lens 103 to adjust a focus in the focus region.

If a focus position of the focus lens 103 is determined for the object through the above-described operations, light is incident onto the CCD 106. The CCD 106 converts information of the incident light into an electrical signal and outputs the electrical signal. The output electrical signal is compressed using a YC transformation or Joint Photographic Experts Group (JPEG) method, and image data is recorded on the recording media 138.

The operation of the photographing apparatus 100 according to the present embodiment will now be described in more detail.

FIG. 3 illustrates an operation of calculating an object distance using the photographing apparatus 100 of FIG. 1.

An operation of detecting a face of a person and an operation of calculating a first object distance D1 using the photographing apparatus 100 will be described with reference to FIG. 3.

The scenes shown in FIG. 3 indicate photographed images at the same focus distance. A standard face region 160 indicating a size of a standard face in a corresponding focus distance is shown in a second picture of FIG. 3. An area of the standard face region 160 is a standard area A of a face in the corresponding focus distance and stored in units of pixel in Table 1. A distance from the face to the photographing apparatus 100 obtained when a substantial size of the face in the photographed image is equal to the standard area A is stored as a standard distance P in Table 1.

TABLE 1

| Focus Distance: f(mm) | Face Standard Area: A(pixel) | Standard Distance: P(m) |
|---|---|---|
| 8 | 17500 | 1.5 |
| 10 | 18230 | 1.8 |
| 12 | 15750 | 2.5 |
| 14 | 16400 | 2.7 |
| 16 | 17500 | 3.0 |

A first picture of FIG. 3 shows a state in which a person 170 is captured in a photographed image. Since a face 172 of the person 170 exists in the photographed image, the face detector circuit 150 compares data patterns to detect a face region 162 of the face 172. The face detector circuit 150 also detects an area of the face 172 from the face region 162.

An operation of calculating the first object distance D1 will now be described.

The face distance operating circuit 152 compares the area of the face region 162 detected by the face detecting circuit 150 with Table 1 to calculate the first object distance D1 from the photographing apparatus 100 to an object. In detail, the face distance operating circuit 152 determines a focus distance f during photographing and obtains the standard area A and the standard distance P corresponding to the focus distance f from Table 1 above.

The face distance operating circuit 152 then calculates the first object distance D1 from the photographing apparatus from the object using Equation 1:

$$D1 = \sqrt{\frac{A}{B}} \times P \times K \quad (1)$$

wherein D1 denotes the first object distance, A denotes the standard area (pixel), B denotes the area of the face region 162 detected by the face detector circuit 150, P denotes the standard distance (m), and K denotes an adjustment coefficient which depends on a characteristic of the photographing apparatus 100, etc.

In the present embodiment, the area of face region is smaller than a standard face region 160. Therefore, according to Equation 1, the first object distance D1 is greater than the standard distance P, and thus a distance from the photographing apparatus 100 to the face 172 is positioned further than the standard distance P.

A third picture of FIG. 3 illustrates a person 170 captured in a photographed image. Since a face 172 of the person 170 is positioned in the photographed image, the face detector circuit 150 compares data patterns to detect a face region 164 of the face 172. The face detector circuit 150 also detects an area of the face 172 from the face region 164. As described above, the face distance operating circuit 152 compares the area of the face region 164 detected by the face detector circuit 150 with Table 1 to calculate the first object distance D1 from the photographing apparatus 100 to an object.

In the present embodiment, the area of the face region 164 is greater than the standard face region 160. Thus, according to Equation 1 above, the first object distance D1 is shorter than the standard distance P, and a distance from the photographing apparatus 100 to the face 172 is closer than the standard distance P.

An operation of detecting a focus position of an object in the face region 162 using the AF detector circuit 154 will now be described.

Figure 4:
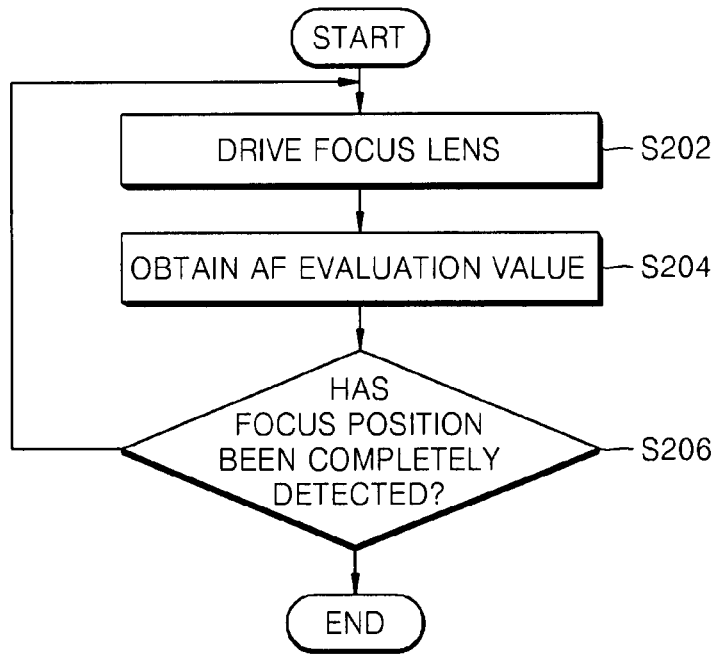
FIG. 4 is a flowchart of an operation of detecting a focus position in the photographing apparatus of FIG. 1.
Figure 5:
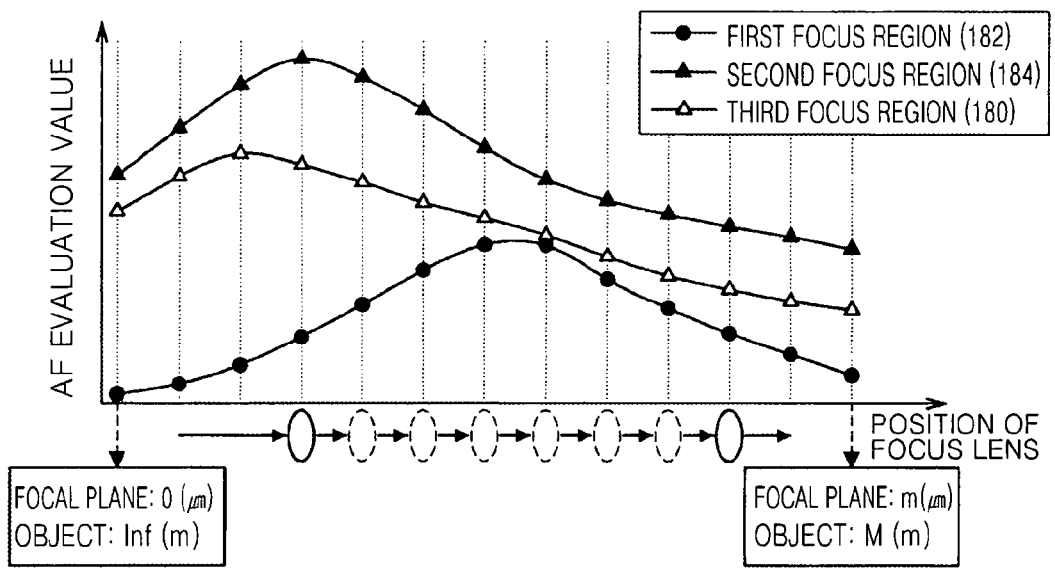
FIG. 5 is a graph illustrating a concept of the operation of FIG. 4.
Figure 6:
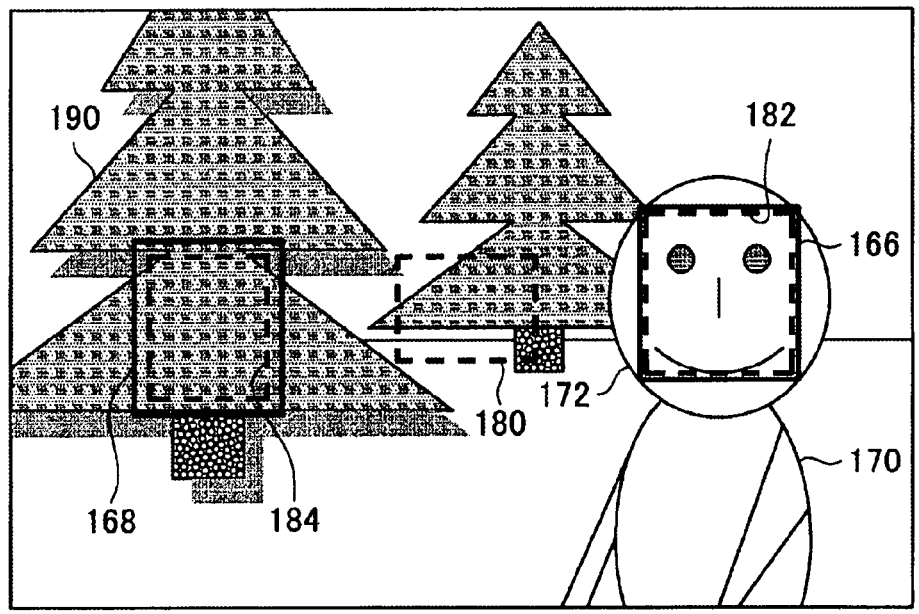
FIG. 6 illustrates a state of the photographing apparatus of FIG. 1 in which a focus region and a face display frame are displayed.

FIG. 4 is a flowchart of an operation of detecting a focus position in a photographing method according to an embodiment of the present invention, FIG. 5 is a graph illustrating a concept of the operation FIG. 5, and FIG. 6 illustrates a focus region and a face display frame displayed on the photographing apparatus of FIG. 1.

Referring to FIG. 4, in operation S202, the focus lens 103 is driven. In operation S204, an AF evaluation value is obtained. In operation S206, a determination is made as to whether a focus position has been completely detected. In other words, the focus lens 103 is driven gradually until the focus position is completely detected to obtain the AF evaluation value.

In detail, the focus lens 103 is driven in the optical system 102 in a relative position of a focal plane between 0 (μm) and m (μm). When the relative position of the focal plane is 0 μm, a depth of field is an infinite circle. When the relative position of the focal plane is m (μm), the depth of field is M (m).

The focus lens 103 is gradually driven by the motor driver 104 in which the AF detector circuit 154 obtains AF evaluation values of face region data and an image central area detected by the face detector circuit 150.

Referring to FIG. 6, a first face display frame 166 is displayed in a face region detected from a face 172 of a person 170 in a photographed image. Also, a second face display frame 168 is displayed in a face region detected from a tree 190. Here, the AF detector circuit 154 obtains AF evaluation values from first, second, and third focus regions 182, 184, and 180 which respectively correspond to a face region detected from the face 172 of the person 170, an area detected from the tree 190, and a central area of a screen.

Referring to FIG. 5, the obtainment of the AF evaluations in the first, second, and third focus regions 182, 184, and 180 contributes to determining in which position the focus lens 103 is focused correctly. While the focus lens 103 moves gradually, the AF evaluation values are stored in a memory. Thus, when the AF evaluation values are maximum, the AF detector circuit 154 may determine that the focus lens 103 is positioned in a most correctly focused position and obtain the relative position of the focus lens 103.

An operation of obtaining the second object distance D2 from the photographing apparatus to the object based on the relative position of the focus lens 103 and a focal distance using the object distance operating circuit 156 will now be described.

The object distance operating circuit 156 calculates the second object distance D2 from the photographing apparatus 100 to the object using Equation 2:

$$D2 = \frac{f^2}{x} \times 10^2 \qquad (2)$$

wherein D2 denotes the second object distance (m), f denotes the focal distance (mm), and x denotes a position of the focus lens 103 in a focus position.

According to Equation 2, the object distance operating circuit 156 calculates the second object distance D2 from the focal distance of the optical system 102 and the position of the focus lens 103 in the focus position.

An operation of calculating a reliability value of face region data by comparing the first object distance D1 with the second object distance D2 using the reliability calculator 112 will now be described.

The reliability calculator 112 compares the first and second object distances D1 and D2 from the photographing apparatus 100 to the object to calculate a correlation value (%) of the face region data as shown in Equation 3:

$$S = \frac{D1}{D2} \times 100 \qquad (3)$$

wherein S denotes the correlation value (%).

The correlation value close to 100% means that the first and second object distances D1 and D2 are close to each other. The correlation value different from 100% means that the first and second object distances D1 and D2 are distant from each other.

Figure 8:
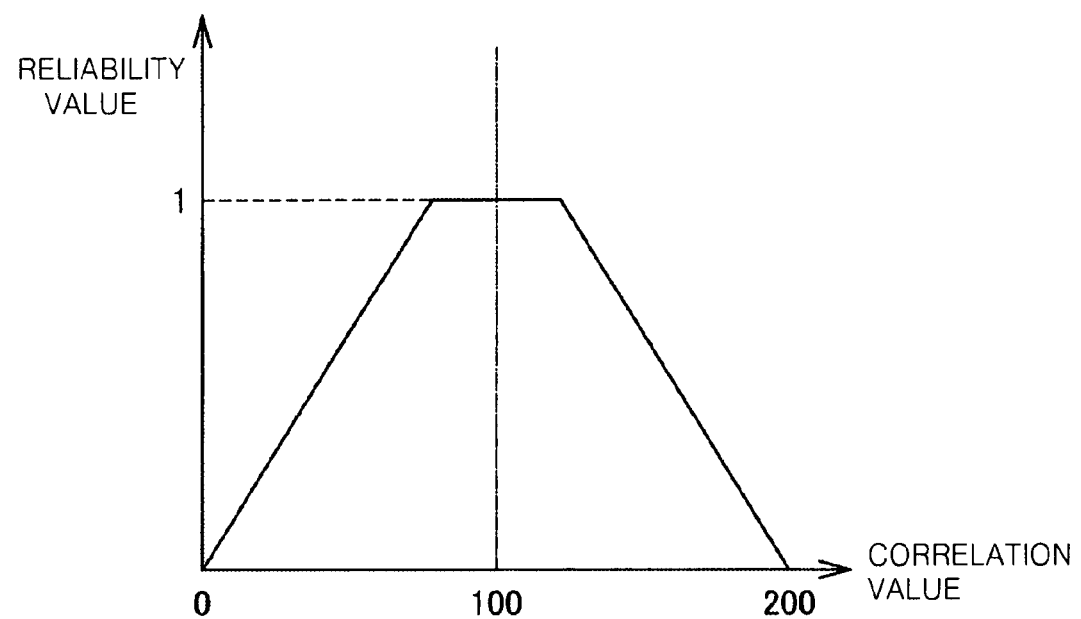
FIG. 8 is a graph illustrating a relationship between a reliability value and a correlation value in a photographing apparatus according to an embodiment of the present invention.

FIG. 8 is a graph illustrating a relationship between a reliability value and a correlation value in a photographing method according to the present invention.

The reliability calculator 112 calculates a reliability value from the relationship of FIG. 8. Referring to FIG. 8, when the correlation value is about 100%, the reliability value is "1." When the correlation value exceeds 100%, the reliability value becomes smaller. The correlation value corresponding to the reliability value of "1" may vary with conditions of the photographing apparatus 100.

Figure 7:
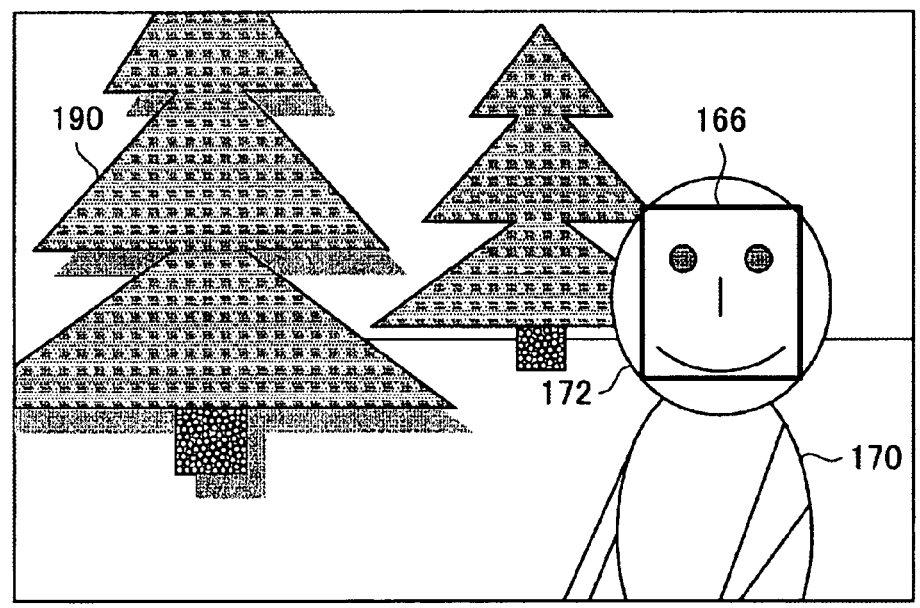
FIG. 7 illustrates a state of the photographing apparatus of FIG. 1 in which the face display frame is displayed on a photographed image.

An operation of recognizing an object of face region data as a face based on the reliability value calculated by the reliability calculator 112 using the face recognizer 114 will now be described. FIG. 7 illustrates a face display frame displayed in an image photographed by the photographing apparatus 100 of FIG. 1.

The face recognizer 114 presets a threshold of the reliability value. If the reliability value is greater than or equal to the threshold, the face recognizer 114 determines an object face region data detected by the face detector circuit 150 as a face. If the reliability value is less than the threshold, the face recognizer 114 determines that the object of the face region data is not the face.

The first object distance D1 obtained by the face distance operating circuit 152 is compared with the second object distance D2 through the above-described operations. If the first and second object distances D1 and D2 are close to each other, the object of the face region data detected by the face detector circuit 150 is determined as the face. If the face recognizer 114 recognizes the object of the face region data as the face, the face display 118 displays a first face display frame 166 around the object recognized as the face in an area of the photographed image as shown in FIG. 7.

If the face recognizer 114 determines that the object is not the face, the second face display frame 168 displayed around the object as shown in FIG. 6 is erased. As a result, only the first face display frame 166 is displayed on the photographed image.

As described above, in a photographing apparatus and method according to the present invention, a face of a person in a photographed image area can be accurately recognized. Also, an error of recognizing an area in which the face of the person is not displayed as the face can be reduced.

In addition, when photographing is performed using the photographing apparatus, the probability of accurately recognizing an area in which the face of the person is displayed as the face can be increased. The likelihood of recognizing an area in which the face of the person is not displayed as one including a face can be reduced. As a result, the likelihood of capturing a poor quality image caused by a face recognition error can be reduced.

Moreover, since the face is accurately recognized, a focus performance of the photographing apparatus can be improved when the person is photographed. Also, a performance of the photographing apparatus of obtaining an optical exposure to the face and a color balance performance of the photographing apparatus can be improved. Embodiments of the present invention may also improve the quality of images due to changes in other settings of a photographing apparatus such as the operation mode. For example, in one embodiment, if a face is detected, the operation mode of the photographing apparatus may automatically switch to portrait mode. In the alternative, if a face is not detected, the photographing apparatus may switch to a scenery mode.

Embodiments of the present invention are not limited to detecting faces. Other objects may also be detected using the techniques disclosed. For example, an embodiment of the present invention may be used to accurately detect objects inside suitcases or boxes for security checks. In another embodiment, a photographing apparatus may be situated by a toll booth to accurately detect and photograph license plates of automobiles passing through.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus comprising:
   an optical system comprising a focus lens;
   a photoelectric transformation element transforming light information into an electrical signal;
   an image signal processor outputting the electrical signal as an image signal;
   a first distance measurer detecting face region data corresponding to a face from the image signal, comparing the face region data with standard face data, and obtaining a first object distance from the photographing apparatus to the face;
   a second distance measurer detecting a focus position for the face and obtaining a second object distance from the photographing apparatus to the face; and
   a face recognizer comparing the first and second object distances and recognizing that the face region data includes data corresponding to the face.

2. The photographing apparatus of claim 1, wherein the first distance measurer comprises:
   a face detector determining the size of the area covered by the detected face region data; and a memory including the size of at least one standard face area at a predetermined distance, wherein the first distance measurer obtains the first object distance partly based on the size of the standard face area and the size of the area covered by the detected face region data.

3. The photographing apparatus of claim 2, wherein the second distance measurer comprises:

a focus position detector detecting the focus position of the focus lens when the face is in focus, wherein the second distance measurer obtains the second object distance partly based on the focus position of the focus lens.

4. The photographing apparatus of claim 1, further comprising:

a reliability value calculator comparing the first and second object distances to calculate a reliability value of the face region data, wherein the face recognizer recognizes that the face region data includes data corresponding to the face partly based on the reliability value.

5. The photographing apparatus of claim 4, further comprising:

an adjuster adjusting at least one of a focus, an exposure, and a color balance for the face.

6. The photographing apparatus of claim 1, further comprising:

a display displaying an image derived from the image signal and an indicator indicating the face in the image.

7. A photographing method comprising:

transforming light beams focused on an optical system forming an image into an electrical signal and outputting the electrical signal as an image signal;

detecting face region data corresponding to a face from the image signal, comparing the face region data with pre-stored standard face data, and obtaining a first object distance from a photographing apparatus to the face;

detecting a focus position for the face and obtaining a second object distance from the photographing apparatus to the face; and comparing the first and second object distances and recognizing that the face region data includes data corresponding to the face.

8. The photographing method of claim 7, wherein the detection of the face region data comprises:

determining the size of the area covered by the detected face region data; and obtaining the first object distance partly by comparing a pre-stored size of a standard face area and the size of the area covered by the detected face region data.

9. The photographing method of claim 8, wherein the detection of the focus position of the object of the face region data comprises:

detecting the focus position of a focus lens when the face is in focus; and obtaining the second object distance partly based on the focus position of the focus lens.

10. The photographing method of claim 7, wherein the comparison between the first and second object distances and recognition that the face region data includes data corresponding to the face comprises:

comparing the first and second object distances to calculate a reliability value of the face region data; and recognizing that the face region data includes data corresponding to the face partly based on the reliability value.

11. The photographing method of claim 7, further comprising:

adjusting at least one of a focus, an exposure, and a color balance for the face.

12. The photographing method of claim 7, further comprising:

displaying the image and an indicator indicating the face in the image.

13. The photographing method of claim 7, further comprising:

changing at least one setting of the photographing apparatus after recognizing that the face region data includes data corresponding to the face.

14. A method for finding an object in an image captured by a photographing apparatus comprising:

selecting data corresponding to an area of the image based on patterns typically found in the object;

calculating a first value corresponding to the distance from the photographing apparatus to the object based on pre-stored, standard data corresponding to the object;

calculating a second value corresponding to the distance from the photographing apparatus to the object based on a position of a focus lens; and determining whether the area includes the object based on the correlation between the first and second values.

15. The method of claim 14, further comprising:
displaying the image; and
displaying an indicator indicating the area of the image including the object.

16. The method of claim 14, further comprising:
modifying one of the focus, exposure, brightness, contrast, saturation and color balance of the area including the object.

17. The method of claim 14, wherein the first value is calculated, in part, by comparing the size of the selected area and a pre-stored, standard size of the object at a predetermined distance.

18. The method of claim 14, wherein the focus lens is positioned such that the area including the object is substantially focused.

19. The method of claim 14, wherein the object is a face.

20. The method of claim 14, further comprising:
changing at least one setting of the photographing apparatus after determining that the area includes the object.

* * * * *